United States Patent
Usuda et al.

(10) Patent No.: US 7,783,320 B2
(45) Date of Patent: Aug. 24, 2010

(54) TRANSMISSION RATE CONTROL METHOD AND MOBILE STATION

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 366 days.

(21) Appl. No.: 11/885,830

(22) PCT Filed: Mar. 10, 2006

(86) PCT No.: PCT/JP2006/304794
§ 371 (c)(1),
(2), (4) Date: Nov. 26, 2007

(87) PCT Pub. No.: WO2006/095871
PCT Pub. Date: Sep. 14, 2006

(65) Prior Publication Data
US 2008/0139133 A1    Jun. 12, 2008

(30) Foreign Application Priority Data
Mar. 11, 2005   (JP)   .............................. 2005-070082

(51) Int. Cl.
*H04B 7/00*   (2006.01)
*H04Q 7/20*   (2006.01)

(52) U.S. Cl. ............................ 455/522; 455/68; 455/69; 455/524; 455/127.1

(58) Field of Classification Search ................ 455/522, 455/13.4, 524, 59, 68, 69, 127.1
See application file for complete search history.

(56) References Cited

U.S. PATENT DOCUMENTS

| | | | | |
|---|---|---|---|---|
| 5,923,650 | A * | 7/1999 | Chen et al. ................... | 370/331 |
| 6,307,867 | B1 | 10/2001 | Roobol et al. | |
| 2004/0219920 | A1 * | 11/2004 | Love et al. ................... | 455/442 |
| 2006/0003790 | A1 * | 1/2006 | Marinier ..................... | 455/522 |

FOREIGN PATENT DOCUMENTS

JP   2003-199173   7/2003

(Continued)

OTHER PUBLICATIONS

3GPP TS 25.309 V6.1.0 (2004-12). Technical Specification, 3rd Generation Partnership Project; Technical Specification Group Radio Access Network; FDD Enhanced Uplink; Overall description; Stage 2. Release 6, p. 1-p. 26.

(Continued)

*Primary Examiner*—Tuan A Pham
(74) *Attorney, Agent, or Firm*—Marvin A. Motsenbocker; Mots Law, PLLC (57) ABSTRACT

A radio base station notifies a maximum allowable transmission rate of uplink user data to a mobile station by using a common transmission rate control channel. The mobile station increases the transmission rate of uplink user data up to the maximum allowable transmission rate by a predetermined step. When a predetermined condition is satisfied, the mobile station requests the radio base station to transmit a dedicated transmission rate control channel. The mobile station determines the transmission rate of uplink user data based on the dedicated transmission rate control channel transmitted from the radio base station.

4 Claims, 8 Drawing Sheets

FOREIGN PATENT DOCUMENTS

| | | |
|---|---|---|
| JP | 2005-065298 | 3/2005 |
| KR | 2001-52354 | 6/2001 |
| KR | 2003-32857 | 4/2003 |

OTHER PUBLICATIONS

Claude Arzelier, "Draft 0 Report of the 46th TSG-RAN WG2 meeting," TSG-RAN WG2 meeting #46, XP-002491101, Scottsdale, USA, Feb. 14-18, 2005, p. 1-57.

Fujitsu, "Contents of Absolute Grant, one bit signalling for Mean Buffer Occupancy Indication: Dynamic Ramping," 3GPP TSG RAN WG2 Meeting #45bis, R2-050169, XP-002491102, Sophia Antiplois, France, Jan. 10-14, 2005, p. 1-4.

Lucent, "Scheduled and Autonomous Mode Operation for the Enhanced Uplink," 3GPP TSG RAN WG1#31, Tdoc R1-03-0284, XP-002491103, Tokyo, Japan, Feb. 17-20, 2003, p. 1-7.

Search Report issued on Aug. 18, 2008 in the counterpart European patent application.

NTT DoCoMo; "Autonomous Rate Ramping for Common Rate Control"; TSGR1(04)1208; 3GPP; Seoul, Korea (Sep. 24, 2004).

The corresponding Korean patent application No. 10-2007-7023185, dated May 25, 2009, and its brief English translation.

\* cited by examiner

TRANSMISSION RATE CONTROL METHOD AND MOBILE STATION

TECHNICAL FIELD

The present invention relates to a transmission rate control method and a mobile station, which controls a transmission rate of uplink user data.

BACKGROUND ART

In a conventional mobile communication system, in an uplink from a mobile station UE to a radio bass station Node B, a radio network controller RNC is configured to determine a transmission rate of a dedicated channel, in consideration of radio resources of the radio base station NodeB, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

Figure 10:
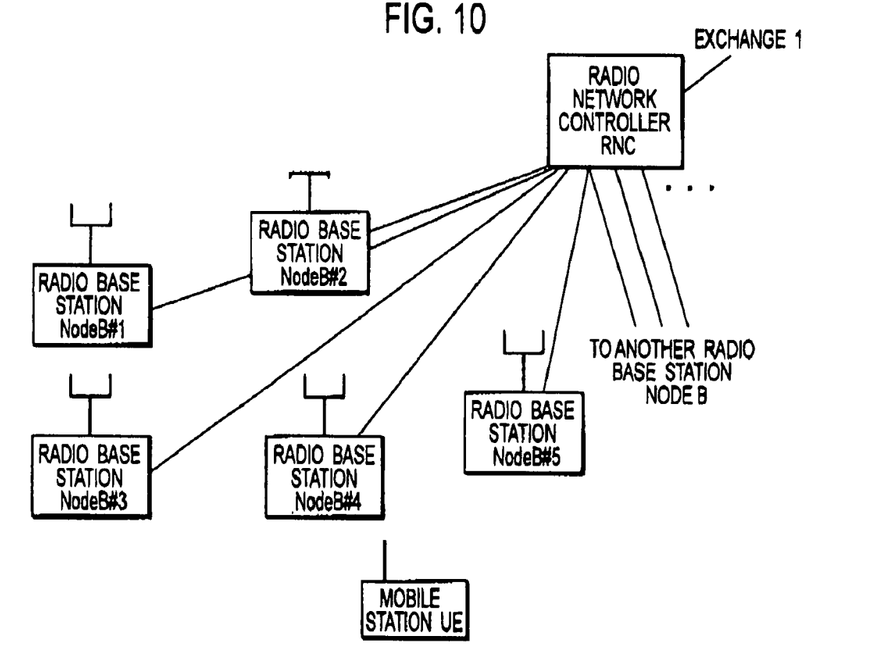
FIG. 10 is a diagram showing an entire configuration of a general mobile communication system.

However, as shown in FIG. 10, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Figure 11:
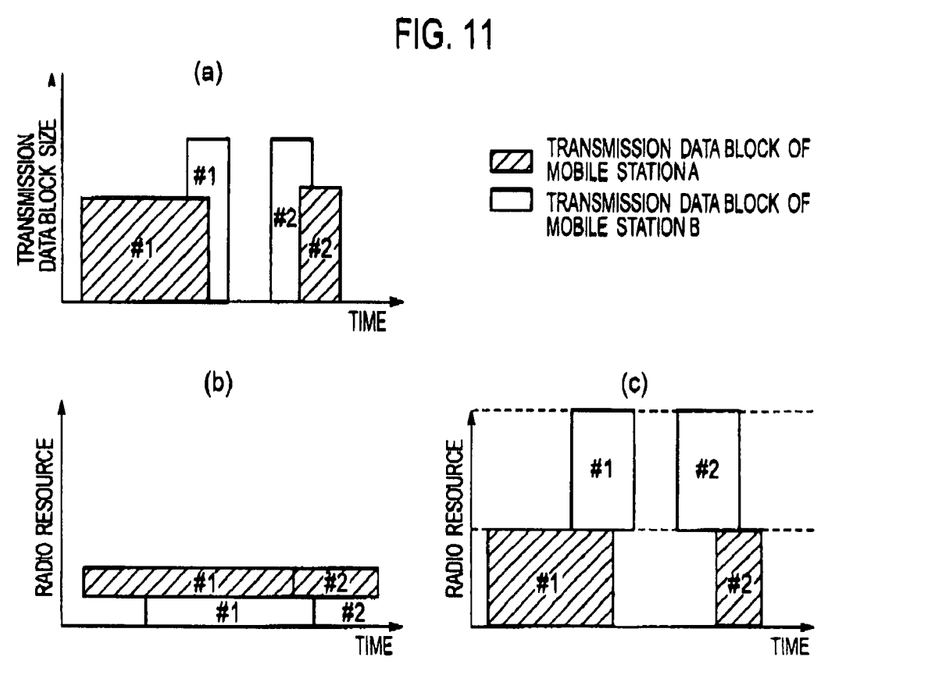

Accordingly, in the conventional mobile communication system, when burst data transmission is performed as shown in FIG. 11(*a*), the data are transmitted by accepting low-speed, high-delay, and low-transmission efficiency as shown in FIG. 11(*b*), or, as shown in FIG. 11(*c*), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 11.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively.

Such discussions or discussed functions will be hereinafter referred to as "Enhanced Uplink (EUL)".

Conventionally, the following two types of transmission rate control method have been known as transmission rate control methods in "EUL". (refer to the Non-patent document 1) Hereinafter, the transmission rate control method will be described in detail.

Firstly, a transmission control method called "RG mode" has been known. "RG mode" is mainly used for a case where a transmission rate of uplink user data is dedicatedly controlled.

It should be noted that "RG mode" is a mode which controls a transmission rate of uplink user by using an absolute transmission rate control channel for notifying absolute value of a transmission rate of uplink user data (or a parameter related to the transmission rate), and a relative transmission rate channel for notifying relative value (Up/Down/Hold) of a transmission rate of uplink user data (or a parameter related to the transmission rate).

Figure 13:
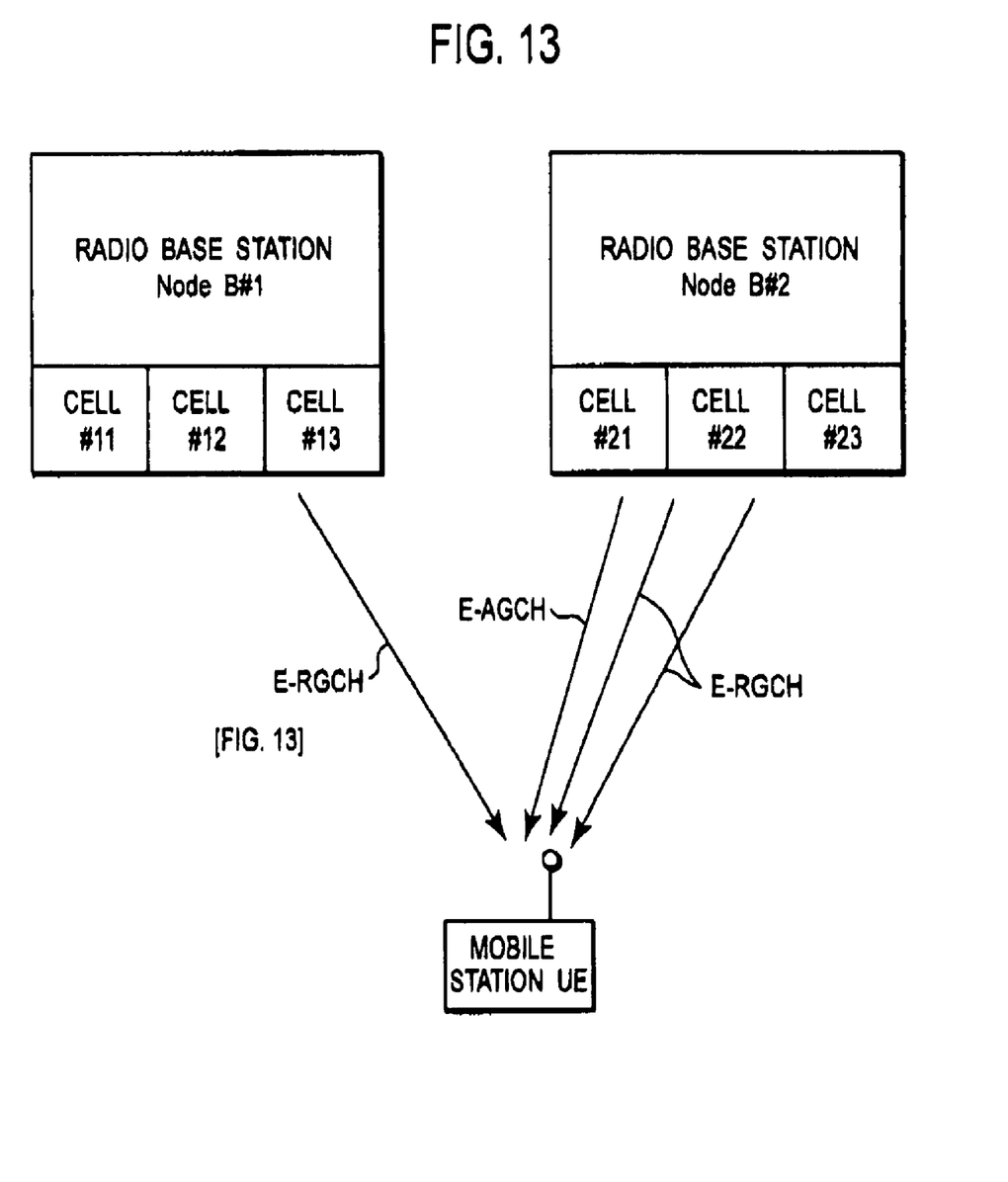
FIG. 13 is a diagram showing a channel configuration for controlling transmission rate of uplink user data in a conventional mobile communication system.

Specifically, as shown in FIG. 13, a mobile station UE is configured to receive absolute value of a transmission rate of uplink user data (or a parameter related to the transmission rate) via an E-AGCH (E-DCH Absolute Grant Channel: Absolute Transmission Rate Control Channel) transmitted from cell #21 of a radio base station Node #2. The cell #21 is a serving cell of the mobile station UE.

Further, as shown in FIG. 13, the mobile station UE is configured to receive relative value of a transmission rate of uplink user data (or a parameter related to the transmission rate) via an E-RGCH (E-DCH Relative Grant Channel: Relative Transmission Rate Control Channel) transmitted from cell # 13 of radio base station Node #1, cell #21 of the radio base station Node B #2, and cell #22 of the radio base station Node B#2. Here, the cell #13 is a non-serving cell of the mobile station UE, the cell #21 is a serving cell of the mobile station UE, and the cell # 22 is a cell belonging to a serving cell set of the mobile station UE.

Generally, unless specified otherwise, the E-RGCH, which is transmitted from the radio base station Node B, indicates any of the E-RGCH transmitted from a serving cell of the radio base station Node B, the E-RGCH transmitted from a cell belonging to a serving cell set, or the E-RGCH transmitted from a non-serving cell. Further, the E-AGCH, which is transmitted from the radio base station Node B, indicates an E-AGCH transmitted from a serving cell of the radio base station Node B.

In "RG mode", the E-RGCH transmitted from the radio base station Node B (specifically, a serving cell of the radio base station Node B, a cell belonging to the serving cell set or a non-serving cell) is a dedicated transmission rate control channel, which is different for each mobile station UE. Further, the E-AGCH transmitted from the radio base station Node B (specifically, a serving cell of the radio base station Node B) is a dedicated transmission rate control channel, which is different for each mobile station UE.

It should be noted that there is a case where E-AGCH is simply referred to as "AGCH (Absolute Grant Channel)" and E-RGCH is simply referred to as "RGCH (Relative Grant Channel)".

Secondly, a transmission control method called "Non-RG mode" or "Autonomous ramping" has been known. "Autonomous ramping" is used when controlling a transmission rate of uplink user data commonly for the mobile stations in the cell.

According to "autonomous ramping", a radio base station Node B notifies an E-AGCH (E-AGCH of FIG. 18 and common transmission rate control channel), which is common for the cells, to mobile station UE, and each of the mobile station UE increases a transmission rate of uplink user data (or a parameter related to the transmission rate of uplink user data) by predetermined steps, from an initial transmission rate (or a parameter related to the initial transmission rate) included in the E-AGCH, up to a maximum allowable transmission rate (or a parameter related to the maximum allowable transmission rate) included in the E-AGCH.

It should be noted that in "Autonomous ramping", each of the mobile station UE is configured to increase the transmission rate of uplink user data up to the maximum allowable transmission rate by predetermined steps. Accordingly, both of the following case can be assumed; a case in which the transmission rate of uplink user data is increased up to the maximum allowable transmission rate by taking a predetermined number of steps; or a case in which the transmission rate of uplink user data is increased up to the maximum allowable rate by taking only one step.

Further, in the EUL, "Scheduled transmission" and "Non-scheduled transmission" is defined.

In "scheduled transmission", a mobile station UE is configured to control a transmission rate of uplink user data based on a transmission rate control channel (absolute transmission rate control channel or relative transmission rate control channel) transmitted from the radio base station Node B. (refer to FIG. 12)

To be more specific, in "scheduled transmission", the mobile station UE is configured to control the transmission rate of uplink user data based on the E-AGCH (absolute transmission rate control channel) and the E-RGCH (relative transmission rate control channel) shown in FIG. 13.

Figure 12:
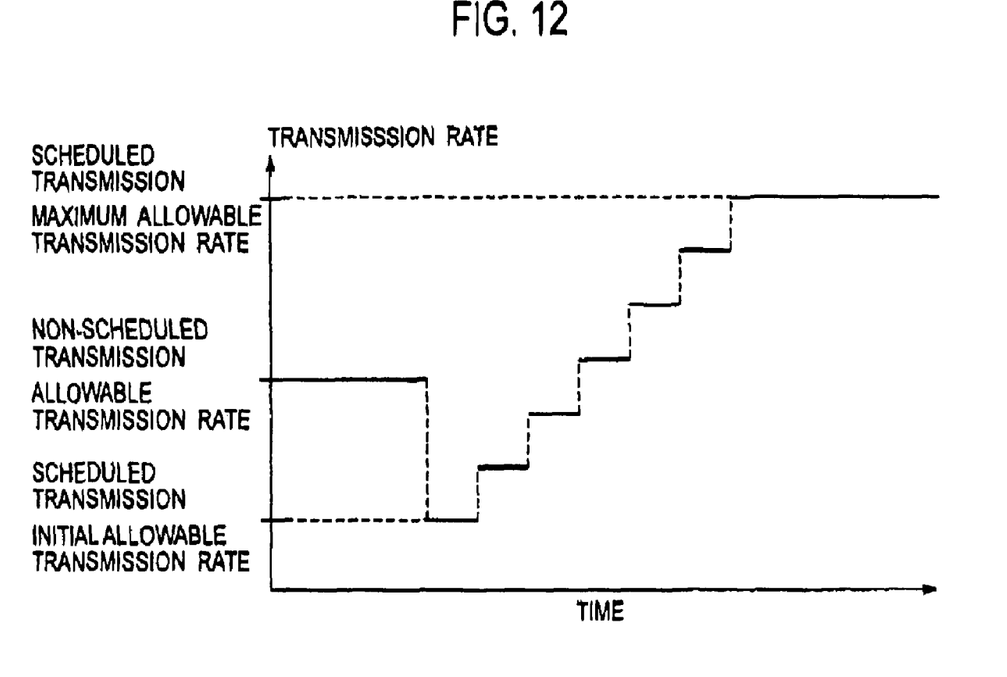
FIG. 12 is a diagram for explaining an operation for controlling transmission rate of the uplink user data in a conventional mobile communication system.

Further, in "non-scheduled transmission", the mobile station UE is configured to, when not receiving the above-described transmission rate control channel, determine the transmission rate of uplink user data for each logical channel or upper data flow within the allowable maximum transmission rate determined by a radio network controller RNC (refer to FIG. 12).

However, in the non-scheduled transmission, the mobile station UE cannot use other than a fixed transmission rate for the transmission rate of uplink user data. Therefore, there has been a problem that the transmission rate of uplink user data has to be set as "high-speed" for a channel in which high-speed response is required.

The present invention has been made considering the above-described problems, and its object is to provide a transmission rate control method and a mobile station that makes it possible to satisfy required quality of communication (QoS) in each channel and to improve a radio quality, by applying "Autonomous ramping" and enabling automatic increase of a transmission rate of uplink user data in the non-scheduled transmission, and by dedicatedly controlling a transmission rate of uplink user data in the scheduled transmission.

(Non-patent Document 1) 3GPP TSG-RAN TS-25.309 v6.1.0

DISCLOSURE OF THE INVENTION

A first aspect of the present invention is summarized as a transmission rate control method for controlling a transmission rate of uplink user data, the method comprising: notifying, at a radio base station, to a mobile station a maximum allowable transmission rate of the uplink user data, by using a common transmission rate control channel; increasing, at the mobile station, the transmission rate of uplink user data up to the maximum allowable transmission rate by a predetermined step; requesting, at the mobile station, the radio based station to transmit a dedicated transmission rate control channel when a predetermined condition is satisfied; and determining, at the mobile station, the transmission rate of uplink user data based on the dedicated transmission rate control channel transmitted from the radio base station.

In the first aspect of the present invention, the predetermined condition may be that an amount of the uplink user data stored in a transmission buffer of the mobile station exceeds a predetermined threshold.

A second aspect of the present invention is summarized as a mobile station for transmitting uplink user data, comprising: a common transmission rate control channel receiving section configured to receive a common transmission rate control channel transmitted from a radio base station; a first transmission rate control section configured to increase a transmission rate of uplink user data, by a predetermined step, up to a maximum allowable transmission rate included in the received common transmission rate control channel; a request section configured to request the radio based station to transmit a dedicated transmission rate control channel when a predetermined condition is satisfied; and a second transmission rate control section configured to determine the transmission rate of uplink user data based on the dedicated transmission rate control channel transmitted from the radio base station.

In the second aspect of the present invention, the predetermined condition may be that an amount of the uplink user data stored in a transmission buffer of the mobile station exceeds a predetermined threshold.

BRIEF DESCRIPTION OF THE DRAWINGS

FIGS. 11(a) to 11 (c) are graphs illustrating operations at the time of burst data transmission in a conventional mobile communication system.

BEST MODE FOR CARRYING OUT THE INVENTION

Mobile Communication System According to First Embodiment of the Present Invention A description will be given of a configuration of a mobile communication system according to a first embodiment of the present invention with reference to FIGS. 1 to 8.

It should be noted that, as shown in FIG. 11, the mobile communication system according to this embodiment is provided with a plurality of radio base stations Node B #1 to Node B #5 and a radio network controller RNC.

The mobile communication system according to the present embodiment is configured to control a transmission rate of user data transmitted via an uplink by a mobile station UE.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, an Enhanced Dedicated Physical Channel, configured of an Enhanced Dedicated Physical Data Channel and an Enhanced Dedicated Physical Control Channel, and a Dedicated Physical Channel, configured of a Dedicated Physical Data Channel (DPDCH) and a Dedicated Physical Control Channel (DPCCH), are used in the uplink.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" and a "Random Access Channel (RACH)", which are needed when the HSPDA is applied, are also used.

The HS-DPCCH transmits a Channel Quality Indicator (CQI) in a downlink and an acknowledge signal (Ack or Nack) for the HS-DPCCH.

Figure 1:
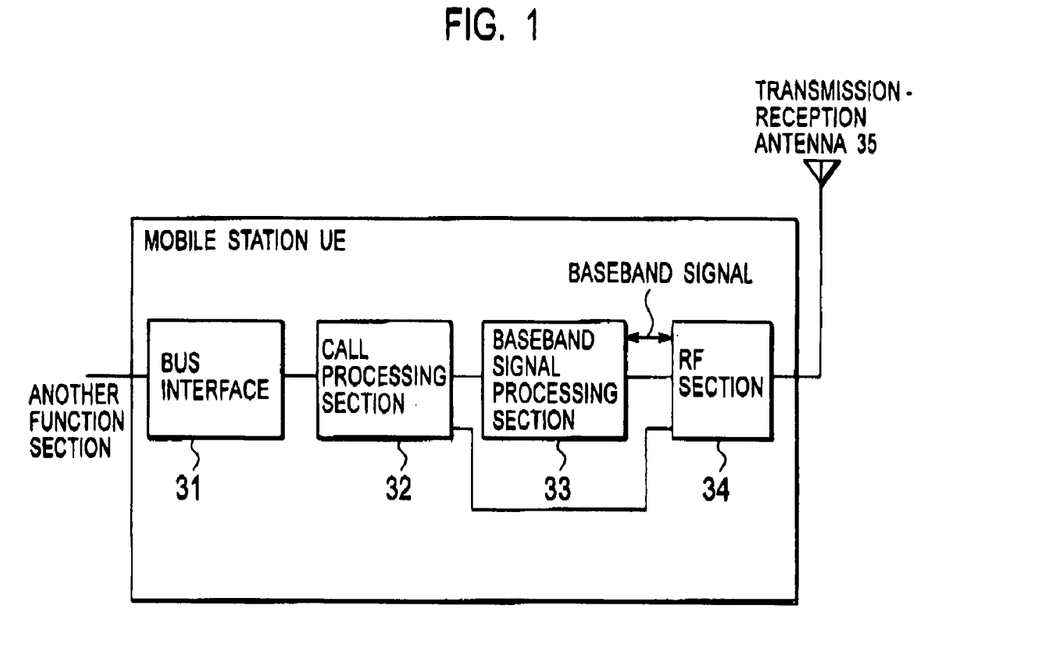
FIG. 1 is a functional block diagram of a mobile station of a mobile communication system according to the first embodiment of the present invention.

As shown in FIG. 1, the mobile station UE according to this embodiment is provided with a bus interface 31, a call processing section 32, a baseband processing section 33, a radio frequency (RF) section 34, and a transmission-reception antenna 86.

However, these functions can be independently present as hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to transmit, to the call processing section 32, the user data acquired by performing, against the baseband signals transmitted from the RF section 84, a Layer 1 processing including a despreading processing, a RAKE combining processing, and an "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 2:
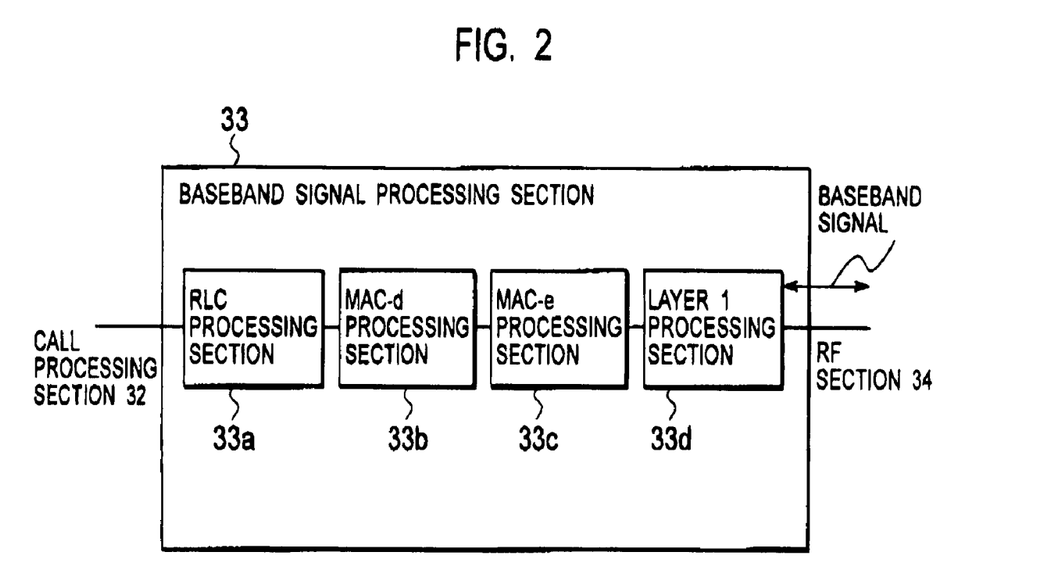
FIG. 2 is a functional block diagram of a baseband signal processing section in a mobile station of the mobile communication system according to the first embodiment of the present invention.

As shown in FIG. 2, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power.

Figure 3:
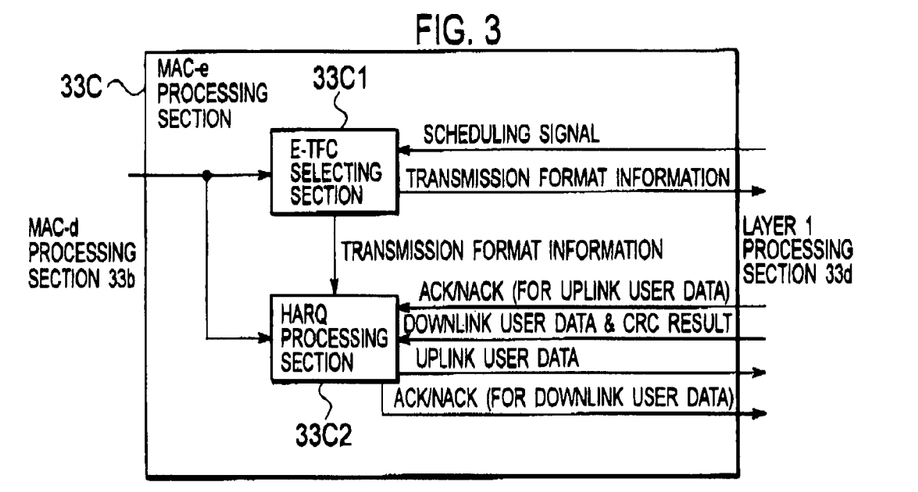
FIG. 3 is a functional block diagram of a MAC-e processing section of the baseband signal processing section in a mobile station of the mobile communication system according to the first embodiment of the present invention.

As shown in FIG. 3, the MAC-e processing section 33c is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission format information to the HARQ processing section 33c2.

Here, the scheduling signals include such as absolute value of the maximum allowable transmission rate of user data in the mobile station UE, which is transmitted by the AGCH (for example, maximum allowable transmission data block size, a maximum value of the transmission power ratio between the E-DPDCH and the DPCCH (maximum allowable transmission power ratio), or the like).

In this description, unless specified otherwise, it is assumed that the maximum allowable transmission rate includes a parameter related to the maximum allowable transmission rate, and the transmission rate includes a parameter related to the transmission rate.

Such scheduling signals are information that is signaled in the cell where the mobile station UE is located, and includes control information for all the mobile stations located in the cell, or a specific group of the mobile stations located in the cell.

When the status is in non-scheduled transmission, the E-TFC selecting section 33c1 is configured to receive a common transmission rate control channel transmitted from the radio base station Node B, and to increase the transmission rate of uplink user data up to the maximum allowable transmission rate by a predetermined step. The maximum allowable transmission rate is included in the received common transmission rate control channel.

In addition, when a predetermined condition is satisfied, e.g., when an amount of uplink user data stored in a transmission buffer of the mobile station UE exceeds a predetermined threshold, the E-TFC selecting section 33c1 is configured to request the radio base station Nods B to transmit a dedicated transmission rate control channel.(i.e. transmitting rate request)

In such a case, the E-TFC selecting section 33c1 is configured to transit to the scheduled transmission status, and to determine the transmission rate of uplink user data based on the dedicated transmission rate control channel transmitted from the radio base station Node B (the E-AGCH or the E-RGCH).

In other words, when the status is in the scheduled transmission status, the E-TFC selecting section 33c1 is configured to control the transmission rate of uplink user data according to "RG mode". Further, when the status is in a non-scheduled transmission status, the E-TFC selecting section 33c1 is configured to control the transmission rate of uplink user data according to "Autonomous ramping".

It should be noted that a predetermined condition for switching between the scheduled transmission status and the non-scheduled transmission status may be other than the amount of the uplink user data stored in the transmission buffer of the mobile station UE.

The HARQ processing section 33c2 is configured to perform process control for the "stop-and-wait of N-process", so as to transmit the user data in the uplink based on an acknowledge signal (Ack/Nack for uplink data) transmitted from the radio base station Node B.

Specifically, the HARQ processing section 33c2 is configured to determine whether or not the receive processing of downlink user data has been successful based on the result of the "Cyclic Redundancy Check (CRC)" entered from the first layer processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33d, the downlink user data entered from the layer-1 processing section 33d when the above-described determination result has been successful.

Figure 4:
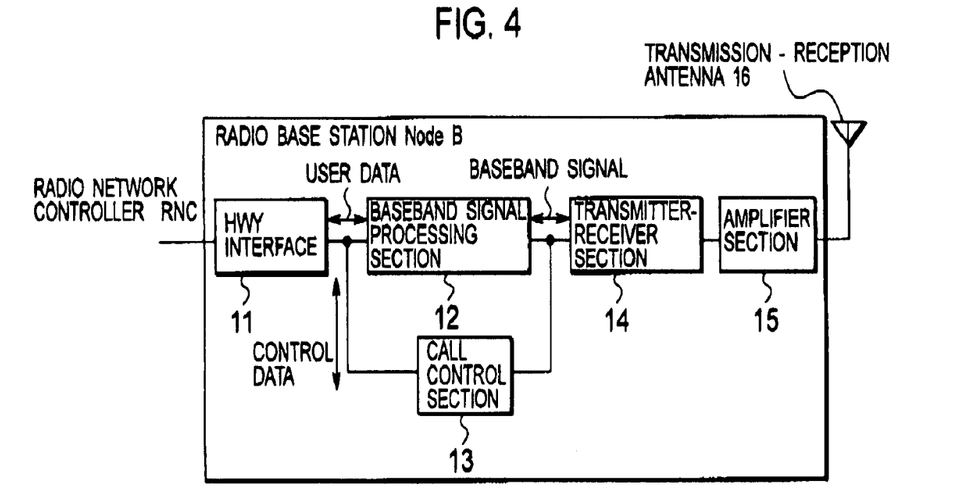
FIG. 4 is a functional block diagram of a radio base station of the mobile communication system according to the first embodiment of the present invention.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface for a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are transmitted from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 5:
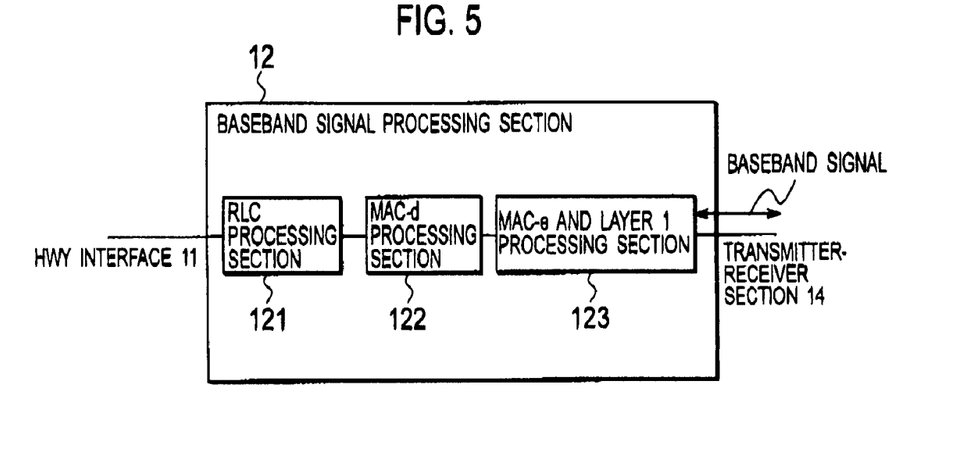
FIG. 5 is a functional block diagram of a baseband signal processing section in a radio base station of the mobile communication system according to the first embodiment of the present invention.

As shown in FIG. 5, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a disposal processing of header against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be acquired by software.

Figure 6:
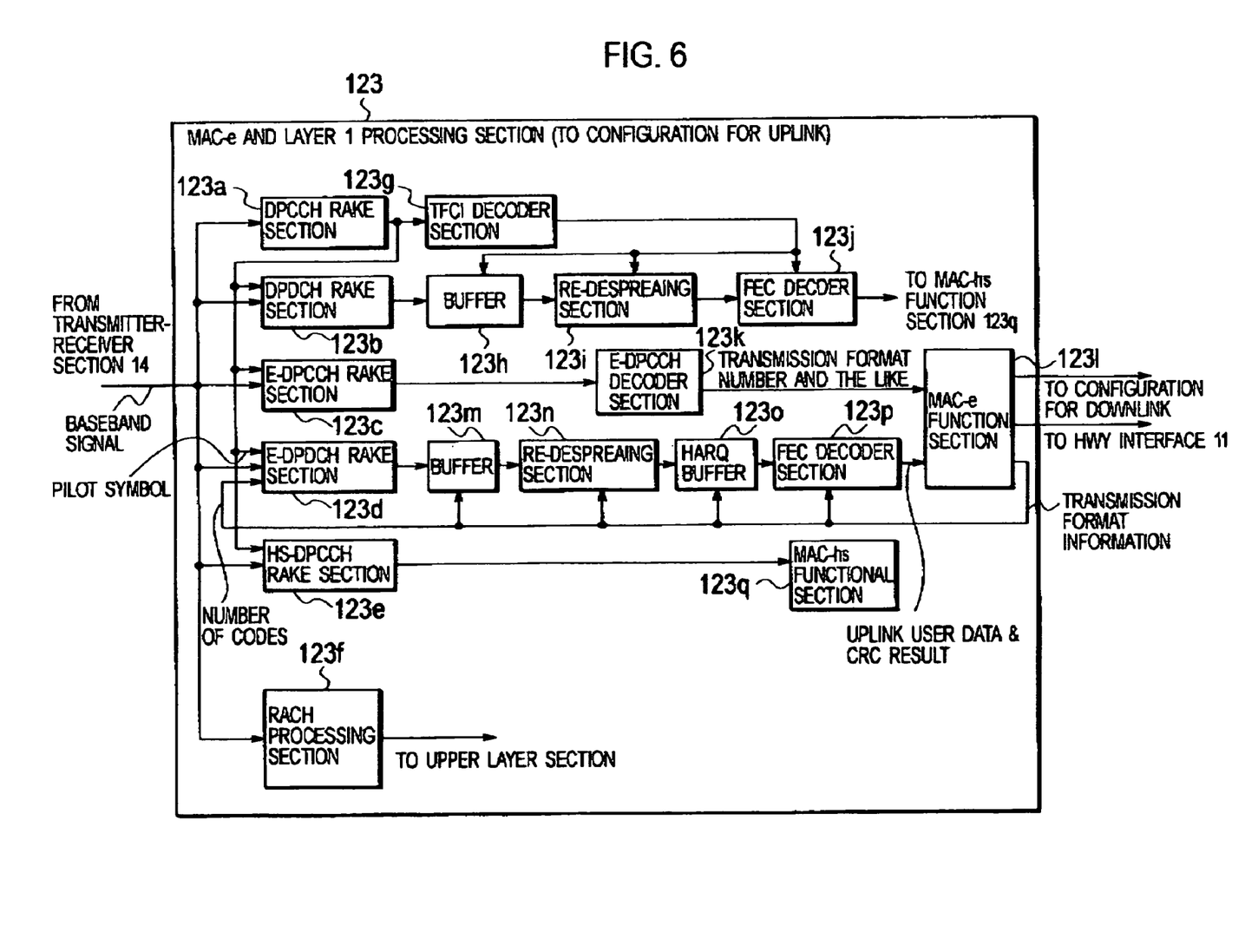
FIG. 6 is a functional block diagram of a MAC-e and Layer 1 processing section (configuration for uplink) of the baseband signal processing section of a radio base station of the mobile communication system according to the first embodiment of the present invention.

As shown in FIG. 6, the MAC-e and layer-1 processing section (configuration for the uplink) 123 is provided with a DPCCH RAKE section 123*a*, a DPDCH RAKE section 123*b*, an E-DPCCH RAKE section 123*c*, an E-DPDCH RAKE section 123*d*, an HS-DPCCH RAKE section 123*e*, a RACH processing section 123*f*, a Transport Format Combination Indicator (TFCI) decoder section 123*g*, buffers 123*h* and 123*m*, re-despreading sections 123*i* and 123*n*, FEC decoder sections 123*j* and 123*p*, an E-DPCCH decoder section 123*k*, a MAC-e functional section 123*l*, an HARQ buffer 123*o*, a MAC-hs functional section 128*q*.

The E-DPCCH RAKE section 123*c* is configured to perform, against the E-DPCCH in the baseband signals transmitted from the transmitter-receiver section 14, the despreading processing and the RAKE combining processing using a pilot symbol included in the DPCCH.

The E-DPCCH decoder section 123*k* is configured to acquire transmission format number related information, HARQ related information, scheduling related information, or the like, by performing the decode processing against the RAKE combining outputs of the E-DPCCH RAKE section 123*c*, so as to enter the information to the MAC-e functional section 123*l*.

The E-DPDCH RAKE section 123*d* is configured to perform, against the E-DPDCH in the baseband signals transmitted from the transmitter-receiver section 14, the despreading processing using the transmission format information (the number of codes) transmitted from the MAC-e functional section 123*l* and the RAKE combining processing using the pilot symbol included in the DPCCH.

The buffer 123*m* is configured to store the RAKE combining outputs of the E-DPDCH RAKE section 123*d* based on the transmission format information (the number of symbols) transmitted from the MAC-e functional section 123*l*.

The re-despreading section 123*n* is configured to perform the despreading processing against the RAKE combining outputs of the E-DPDCH RAKE section 123*m*, based on the transmission format information (spreading factor) transmitted from the MAC-e functional section 123*l*.

The HARQ buffer 123*o* is configured to store the despreading processing outputs of the re-despreading section 123*n*, based on the transmission format information transmitted from the MAC-e functional section 123*l*.

The FEC decoder section 123*p* is configured to perform an error correction decoding processing (the FEC decoding processing) against the despreading processing outputs of the re-despreading section 123*n*, which is stored in the HARQ buffer 123*o*, based on the transmission format information (transmission data block size) transmitted from the MAC-e functional section 123*l*.

The MAC-e functional section 123*l* is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123*k*.

Figure 7:
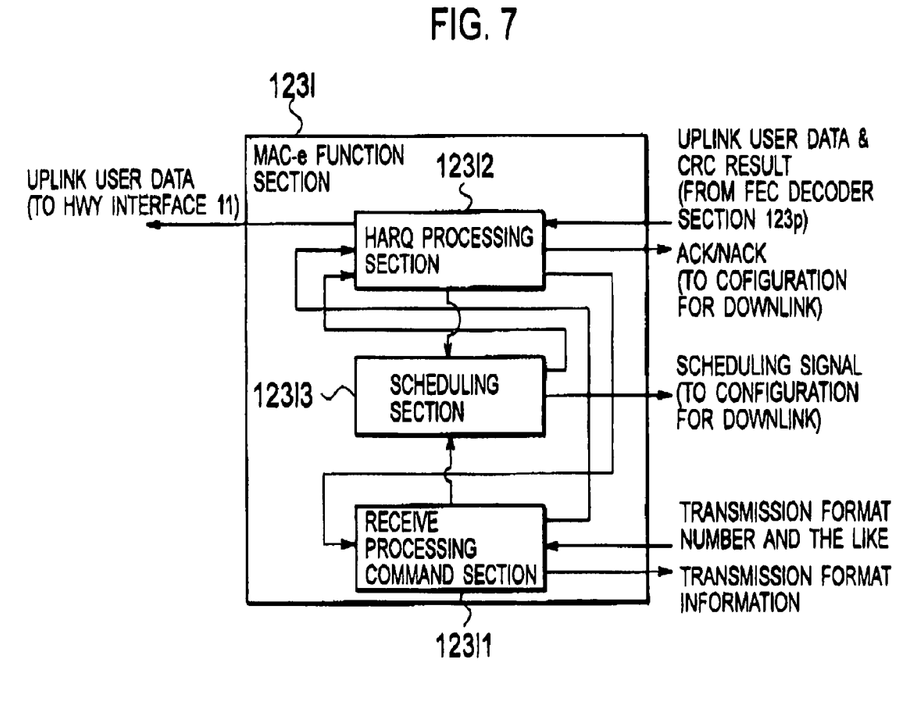
FIG. 7 is a functional block diagram of a MAC-e functional section of the MAC-e and Layer 1 processing section (configuration for uplink), in the baseband signal processing section in a radio base station of the mobile communication system according to the first embodiment of the present invention.

In addition, as shown in FIG. 7, the MAC-e functional section 123*l* is provided with a receive processing command section 123*l*/1, an HARQ processing section 123/2, and a scheduling section 123/3.

The receive processing command section 121/1 is configured to transmit the transmission format number related information, the HARQ related information, and the scheduling related information, which are entered from the E-DPCCH decoder section 123, to the HARQ processing section 123/2.

In addition, the receive processing command section 123/1 is configured to transmit, to the scheduling section 123/3, the scheduling related information entered from the E-DPCCH decoder 123*k*.

Further, the receive processing command section 123/1 is configured to output the transmission format information corresponding to the transmission format number entered from the E-DPCCH decoder section 123*k*.

The HARQ processing section 123/2 is configured to determine whether or not the receive processing of uplink user data has been successful, based on the CRC result entered from the FEC decoder section 123*p*.

Then, the HARQ processing section 123/2 is configured to generate an acknowledge signal (Ack or Nack), based on the determination result, so as to transmit the generated acknowledge signal to the configuration for the downlink of the baseband signal processing section 12.

In addition, the HARQ processing section 123/2 is configured to transmit the uplink user data entered from the FEC decoder section 123p to the radio network controller RNC, when the above determination result has been successful.

In addition, the HARQ processing section 123/2 is configured to clear soft decision values stored in the HARQ buffer 123o, when the above determination result has been successful.

On the other hand, the HARQ processing section 123/2 is configured to store, in the HARQ buffer 123o, the uplink user data, when the above determination result has not been successful.

In addition, the HARQ processing section 123/2 is configured to forward the above determination result to the receive processing command section 123/1.

The receive processing control command section 123/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when the uplink user data is stored in the buffer 123m, the receive processing command section 123/1 is configured to instruct the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123/3 is configured to instruct the configuration for the downlink of the baseband signal processing section 12 to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

To be more specific, the scheduling section 123/3 is configured to determine the maximum allowable transmission rate based on an information (radio resource in the uplink) related to the scheduling transmitted from E-DPCCH decoder section 123k, and to control the transmission rate of user data of the communicating mobile station.

The scheduling section 123/3 is configured to transmit the common transmission rate control channel including the initial transmission rate and the maximum allowable transmission rate, to each of the cell. Further, the scheduling section 123/3 is configured to transmit the dedicated transmission rate control channel to each of the mobile station UE in the scheduled transmission status.

The radio network controller RNC according to the present embodiment is an apparatus located on upper level of the radio base station Node B and configured to control radio communication between the radio base station Node B and the mobile station UE.

Figure 8:
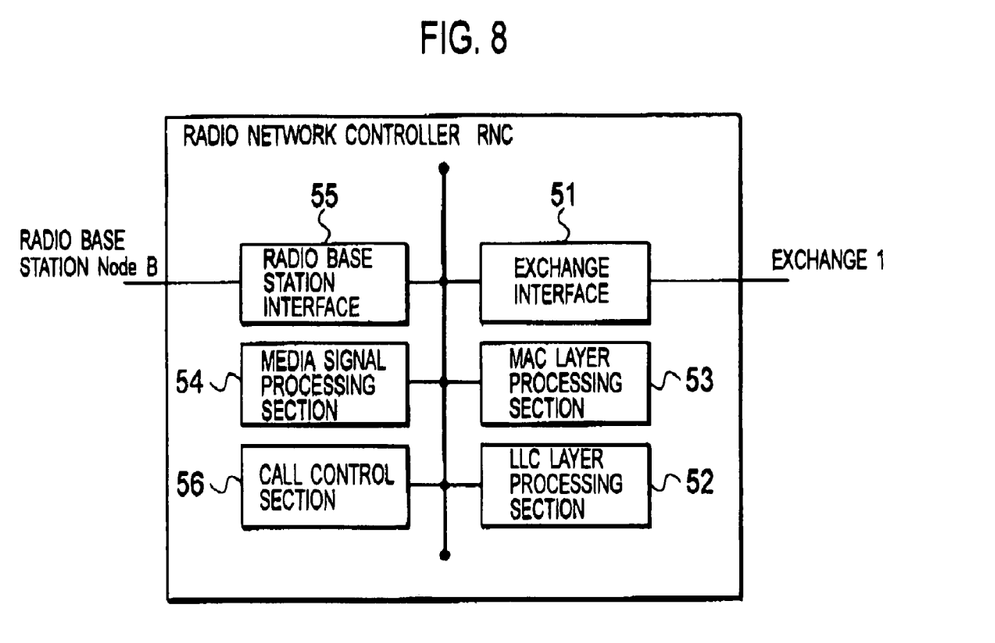
FIG. 8 is a functional block diagram of a radio network controller of the mobile communication system according to the first embodiment of the present invention.

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sub-layer processing such as a synthesis processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like. Here, the radio resource control processing includes a call admission control processing, a handover processing, or the like.

Figure 9:
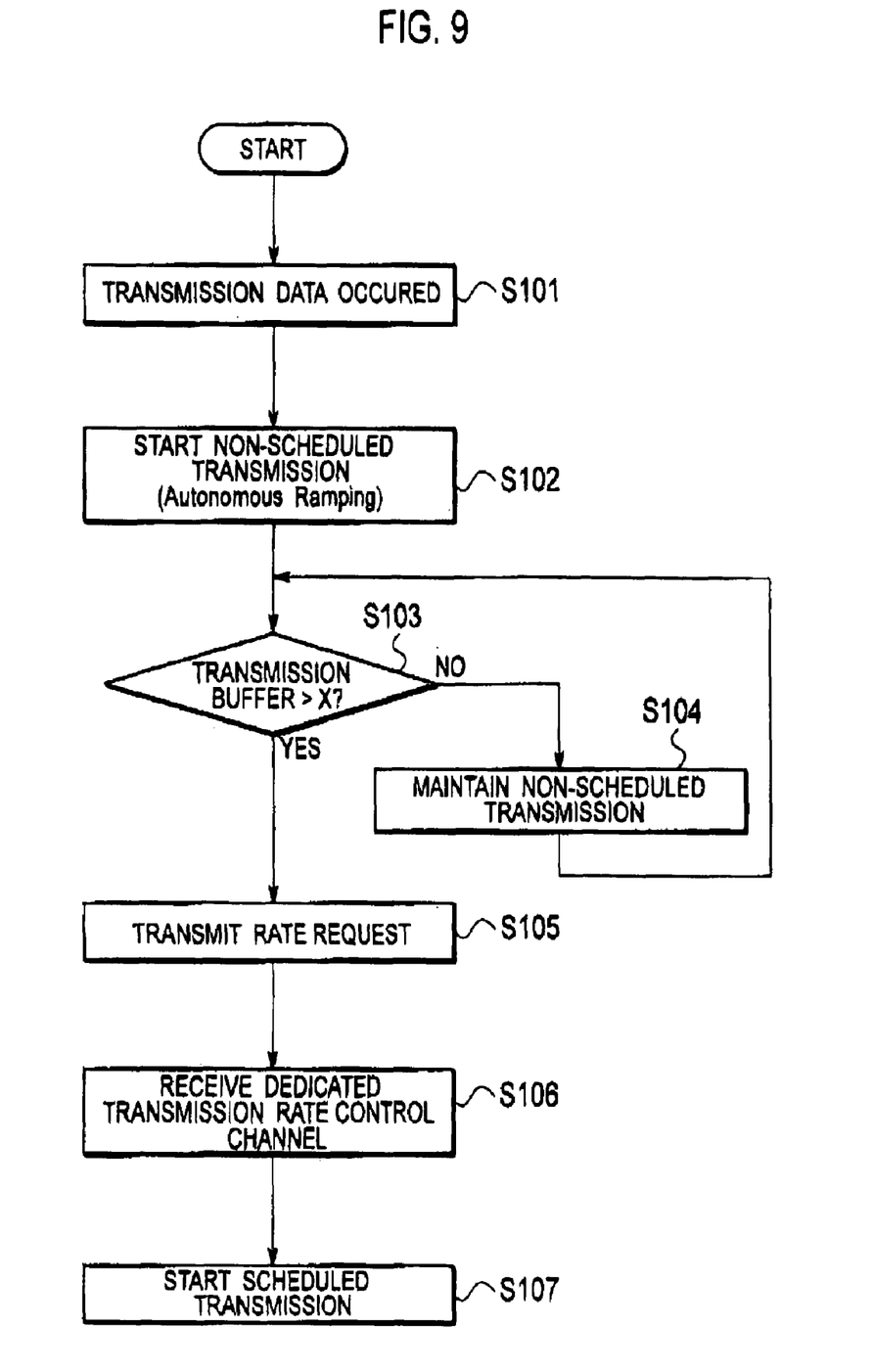
FIG. 9 is a flowchart of an operation of a mobile communication system according to the first embodiment of the present invention.

With reference to FIG. 9, the operation of the mobile communication system according to the first embodiment of the present invention will be described.

As shown in FIG. 9, in step 101, when uplink user data to be transmitted is occurred, in step 102, the mobile station UE starts non-scheduled transmission in which Autonomous ramping is applied.

In other words, the mobile station UE increases the transmission rate of uplink user data by a predetermined step, from the initial transmission rate included in the common transmission rate control channel up to the maximum allowable transmission rate included in the common transmission rate control channel.

In step 103, the mobile station UE determines whether or not the amount of the uplink user data stored in the transmission buffer of the mobile station UE exceeds the predetermined threshold X.

When it is determined that the amount of the uplink user data does not exceed the predetermined threshold X, in step 104, the mobile station UE maintains the above-described non-scheduled transmission.

On the other hand, when it is determined that the amount of the uplink user data exceeds the predetermined threshold X, in step 105, the mobile station UE transmits a rate request to the radio base station Node B.

In step 106, the radio base station Node B transmits the dedicated transmission rate control channel (the E-AGCH including absolute value of the transmission rate of uplink user data, or the E-RGCH including relative value (Up/Down/Hold) of the transmission rate of uplink user data).

In step 106, the mobile station UE starts the scheduled transmission based on the above-described dedicated transmission rate control channel.

INDUSTRIAL APPLICABILITY

As described above, the present invention can provide a transmission rate control method and a mobile station that makes it possible to satisfy required quality of communication (QoS) in each channel and to improve a radio quality, by applying "Autonomous ramping" and enabling automatic increase of a transmission rate of uplink user data, and by dedicatedly controlling a transmission rate of uplink user data in the scheduled transmission.

The invention claimed is:

1. A transmission rate control method for controlling a transmission rate of uplink user data, comprising:
    notifying, at a radio base station, to a mobile station a maximum allowable transmission rate of the uplink user data, by using a common transmission rate control channel;
    increasing, at the mobile station, the transmission rate of the uplink user data up to the maximum allowable transmission rate by a predetermined step;
    requesting, at the mobile station, the radio based station to transmit a dedicated transmission rate control channel when a predetermined condition is satisfied; and
    determining, at the mobile station, the transmission rate of the uplink user data based on the dedicated transmission rate control channel transmitted from the radio base station.

2. The transmission rate control method according to claim 1, wherein the predetermined condition is that an amount of the uplink user data stored in a transmission buffer of the mobile station exceeds a predetermined threshold.

3. A mobile station for transmitting uplink user data, comprising:
    a common transmission rate control channel receiving section configured to receive a common transmission rate control channel transmitted from a radio base station;
    a first transmission rate control section configured to increase a transmission rate of the uplink user data, by a predetermined step, up to a maximum allowable transmission rate included in the received common transmission rate control channel;
    a request section configured to request the radio based station to transmit a dedicated transmission rate control channel when a predetermined condition is satisfied; and
    a second transmission rate control section configured to determine the transmission rate of uplink user data based on the dedicated transmission rate control channel transmitted from the radio base station.

4. The mobile station according to claim 3, wherein the predetermined condition is an amount of the uplink user data stored in a transmission buffer of the mobile station exceeds a predetermined threshold.

* * * * *